(12) United States Patent
Kim

(10) Patent No.: US 11,263,788 B2
(45) Date of Patent: Mar. 1, 2022

(54) APPARATUS AND METHOD FOR SUPERIMPOSING TEETH DATA IMAGE ONTO FACE IMAGE

(71) Applicant: Tae Weon Kim, Seoul (KR)

(72) Inventor: Tae Weon Kim, Seoul (KR)

(*) Notice: Subject to any disclaimer, the term of this patent is extended or adjusted under 35 U.S.C. 154(b) by 6 days.

(21) Appl. No.: 17/090,927

(22) Filed: Nov. 6, 2020

(65) Prior Publication Data

US 2021/0142529 A1 May 13, 2021

(30) Foreign Application Priority Data

Nov. 8, 2019 (KR) .......... 10-2019-0142863

(51) Int. Cl.
| | |
|---|---|
| *G06T 11/00* | (2006.01) |
| *G06K 9/46* | (2006.01) |
| *A61C 7/00* | (2006.01) |
| *A61C 9/00* | (2006.01) |
| *G06K 9/00* | (2022.01) |

(52) U.S. Cl.
CPC .............. *G06T 11/00* (2013.01); *A61C 7/002* (2013.01); *A61C 9/0053* (2013.01); *G06K 9/00281* (2013.01); *G06K 9/46* (2013.01)

(58) Field of Classification Search
CPC ....... G06T 11/00; A61C 7/002; A61C 9/0053; A61C 9/0046; A61C 5/007; G06K 9/00281; G06K 9/46; G06K 2209/055; A61B 5/0035; A61B 5/0077; A61B 5/0088; A61B 5/7425
See application file for complete search history.

(56) References Cited

U.S. PATENT DOCUMENTS

| | | | |
|---|---|---|---|
| 2007/0207437 A1* | 9/2007 | Sachdeva | A61C 9/0046 433/24 |
| 2009/0148805 A1* | 6/2009 | Kois | A61C 19/10 433/24 |
| 2010/0145898 A1* | 6/2010 | Malfliet | G06T 7/0012 706/47 |
| 2013/0218530 A1* | 8/2013 | Deichmann | A61C 5/77 703/1 |
| 2014/0127639 A1* | 5/2014 | Hirabayashi | A61B 5/1072 433/24 |

FOREIGN PATENT DOCUMENTS

KR 101887198 B1 9/2018

* cited by examiner

*Primary Examiner* — Maurice L. McDowell, Jr.
(74) *Attorney, Agent, or Firm* — Bayramoglu Law Offices LLC

(57) ABSTRACT

An apparatus and method for superimposing a teeth data image onto a face image is provided. The apparatus for superimposing the teeth data image onto the face image includes a scanner for generating a teeth data image by scanning a teeth of a patient; a camera for obtaining a side face image by photographing a side face of the patient; and a control unit for extracting a feature point of the side face image, extracting a reference line of the side face based on the feature point, adjusting a size of the teeth data image according to a length of the reference line of the side face, and superimposing the teeth data image onto the side face image.

10 Claims, 8 Drawing Sheets

(a)

(b)

APPARATUS AND METHOD FOR SUPERIMPOSING TEETH DATA IMAGE ONTO FACE IMAGE

CROSS-REFERENCE TO RELATED APPLICATION

This application claims priority to and the benefit of Korean Patent Application No. 10-2019-0142863, filed on Nov. 8, 2019, the disclosure of which is incorporated herein by reference in its entirety.

TECHNICAL FIELD

The present invention relates to an apparatus and method for superimposing teeth data image onto face image.

BACKGROUND

Transparent orthodontic treatment is an orthodontic treatment method using a device (aligner) that covers almost all teeth with a thin film-like material using a transparent material without attaching orthodontic devices such as brackets to the teeth.

At this time, before starting transparent orthodontic treatment, a method of showing a predicted result of post treatment to a patient on a computer monitor is commonly used. In order to obtain such data, patient's teeth data, face photos, and X-ray data are needed.

Conventionally, the disadvantage is that the resulting data is not accurate since it is not easy to accurately and meaningfully match the composite parts of the images in order to produce such before-and-after predictive simulation data. In addition, it was not checked immediately after examination since such synthesis process took as much time as 2-3 hours.

SUMMARY

Various aspects of the present invention are directed to providing an apparatus and method for superimposing teeth data image onto face image to easily and quickly superimpose teeth data image onto face image.

The technical problems to be solved in the present invention are not limited to the technical problems mentioned above, and other technical problems not mentioned will be clearly understood by those of ordinary still in the art from the following description.

According to an aspect of the present invention, there is provided an apparatus for superimposing teeth data image onto face image, including: a scanner for generating a teeth data image by scanning a patient's teeth; a camera for obtaining a side face image by photographing the patient's side face; and a control unit for extracting a feature point of the side face image, extracting a reference line of the side face based on the feature point, adjusting a size of the teeth data image according to a length of the reference line of the side face, and superimposing it onto the side face image.

In one embodiment, the control unit may extract a first feature point (Nasion) at which a nose begins and a second feature point (Pogonion), a most projecting point of a lower face, from the side face image, and extract the reference line of the side face connecting the first feature point and the second feature point.

In one embodiment, the control unit may calculate a shortest distance between a rearmost molar distal point and a maxillary incisor point from the teeth data image, and adjust the size of the teeth data image so that the shortest distance becomes a predetermined ratio to the length of the reference line of the side face.

In one embodiment, the control unit may extract a third feature point (Stomion), at which upper and lower lips meet, from the side face image, and superimpose the teeth data image onto the side face image so that an occlusion line of the teeth data image is rotated clockwise at a predetermined angle with respect to a perpendicular line on which the reference line of the side face and the third feature point are at a right angle and a maxillary incisor point of the teeth data image is located on the reference line of the side face.

In one embodiment, the apparatus for superimposing teeth data image onto face image further includes a display unit for displaying the superimposed image.

According to another aspect of the present invention, there is provided a method for superimposing teeth data image onto face image, including: generating, by a scanner, a teeth data image by scanning a patient's teeth; obtaining, by a camera, a side face image by photographing the patient's side face; extracting, by a control unit, a feature point of the side face image and then extracting a reference line of the side face based on the feature point; adjusting, by the control unit, a size of the teeth data image according to a length of the reference line of the side face; and superimposing, by the control unit, the size-adjusted teeth data image onto the side face image.

In one embodiment, the extracting may include extracting a first feature point (Nasion) at which a nose begins and a second feature point (Pogonion), a most projecting point of a lower face, from the side face image, and extracting the reference line of the side face connecting the first feature point and the second feature point.

In one embodiment, the adjusting may include calculating a shortest distance between a rearmost molar distal point and a maxillary incisor point from the teeth data image, and adjusting the size of the teeth data image so that the shortest distance becomes a predetermined ratio to the length of the reference line of the side face.

In one embodiment, the superimposing may include extracting a third feature point (Stomion), at which upper and lower lips meet, from the side face image, and superimposing the teeth data image onto the side face image so that an occlusion line of the teeth data image is rotated clockwise at a predetermined angle with respect to a perpendicular line on which the reference line of the side face and the third feature point are at a right angle and a maxillary incisor point of the teeth data image is located on the reference line of the side face.

In one embodiment, the method for superimposing teeth data image onto face image may further include displaying the superimposed image.

The apparatus and method for superimposing teeth data image onto face image according to an embodiment of the present invention may quickly superimpose images in a simple manner by superimposing the teeth data image using the reference line of the side face image based on the feature point. With this, it is possible to quickly check the predicted result immediately after examination and correct the treatment goal, thus improving the efficiency of transparent orthodontic treatment.

In addition, the apparatus and method for superimposing teeth data image onto face image according to an embodiment of the present invention may generate superimposed image accurately by adjusting the size of the teeth data image according to the length of the reference line of the side face image and superimposing it, thus improving the reliability of the predicted result for transparent orthodontic treatment.

BRIEF DESCRIPTION OF THE DRAWINGS

The above and other objects, features, and advantages of the present invention will become more apparent to those of ordinary skill in the art by describing exemplary embodiments thereof in detail with reference to the accompanying drawings, in which.

DETAILED DESCRIPTION OF THE EMBODIMENTS

Figure 1:
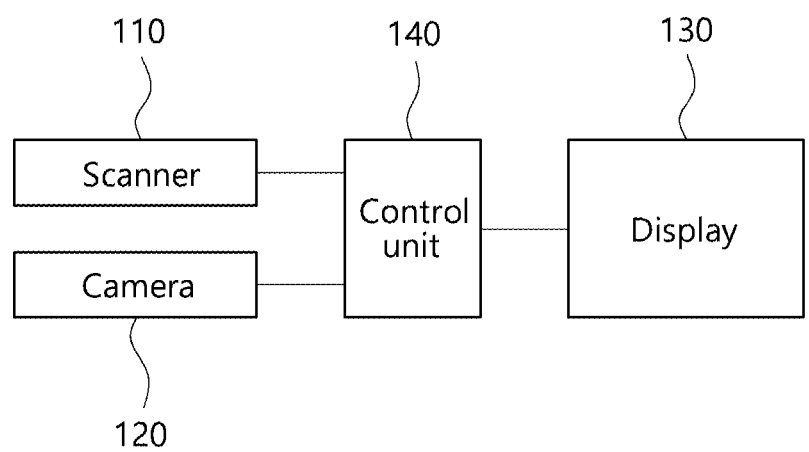
FIG. 1 is a block diagram of an apparatus for superimposing teeth data image onto face image according to an exemplary embodiment of the present invention.

Hereinafter, exemplary embodiments of the present invention will be described in detail so that those of ordinary skill in the art can readily implement the present invention. The present invention may be embodied in many different forms and are not limited to the embodiments set forth herein. In the drawings, parts unrelated to the description are omitted for clarity. Throughout the specification, like reference numerals denote like elements.

Embodiments of the present invention are provided to describe the present invention more fully to those skilled in the art, the embodiments described below can be modified into various other forms, and the scope of the present invention is not limited to the following embodiments. Rather, these embodiments make the invention more meaningful and complete and are provided for fully conveying the concept of the invention to those skilled in the art.

Figure 2:
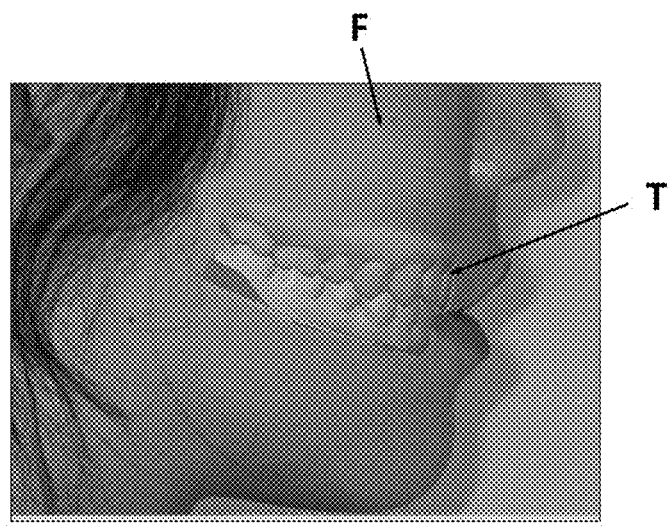
FIG. 2 is an image superimposed by the apparatus for superimposing teeth data image onto face image according to an exemplary embodiment of the present invention.
Figure 3:
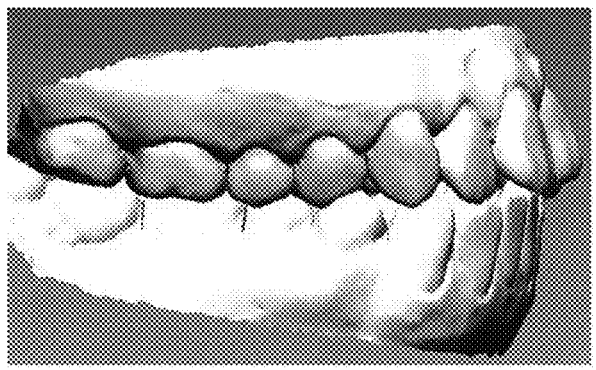
FIG. 3 is a set of images used by the apparatus for superimposing teeth data image onto face image wherein (a) is a teeth data image before treatment and (b) is a teeth data image after treatment according to an exemplary embodiment of the present invention.
Figure 3:
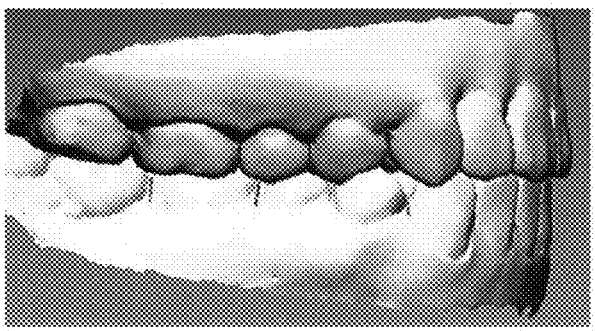

FIG. 1 is a block diagram of an apparatus for superimposing teeth data image onto face image according to an exemplary embodiment of the present invention, FIG. 2 is an image superimposed by the apparatus for superimposing teeth data image onto face image according to an exemplary embodiment of the present invention, and FIG. 3 is a set of images used by the apparatus for superimposing teeth data image onto face image wherein (a) is a teeth data image before treatment and (b) is a teeth data image after treatment according to an exemplary embodiment of the present invention.

Referring to FIG. 1, an apparatus 100 for superimposing teeth data image onto face image according to an embodiment of the present invention includes a scanner 110, a camera 120, a display unit 130, and a control unit.

The apparatus 100 for superimposing teeth data image onto face image is a simpler and faster instrument to meet the needs of a patient and to immediately show a predicted result data to the patient, that is, is directed to show comparison of before-and-after side face images on a computer monitor right after examination using the patient's data such as teeth, teeth data, and facial pictures.

Referring to FIG. 2, the apparatus 100 for superimposing teeth data image onto face image may accurately and quickly superimpose a patient's teeth data image (T) onto the patient's side face image (F). In this case, the apparatus 100 for superimposing teeth data image onto face image may extract a reference line of a side face and a reference line of teeth, and superimpose a teeth data image onto a side face image by adjusting the position and size of teeth in a person's side face picture.

Referring to FIG. 3, the apparatus 100 for superimposing teeth data image onto face image may predict easily and accurately a patient's state of before-and-after treatment by superimposing (a) before-treatment teeth data image and (b) after-treatment teeth data image onto a side face image (F), respectively.

In this case, the change of the side face according to the change of the teeth position may be calculated by the change of lips from the superimposed data.

Such predicted result data of before-and-after treatment may be quickly determined or corrected by a doctor or patient. At this time, the predicted result data is transmitted to a dental treatment program and the dental treatment program may generate a STL (STereoLithography) file for each treatment step based on the predicted result data.

The scanner 110 may scan a patient's teeth. For example, the scanner 110 may be a intraoral scanner or a model scanner. In this case, the scanner 110 may generate a teeth data image (T).

The camera 120 may photograph a patient's side face. For example, the camera 120 may be a digital camera or a cell phone camera. In this case, the camera 120 may obtain a side face image.

The display unit 130 may display an image superimposed by the control unit 140. For example, the display unit 130 may be a monitor that is integral with the control unit 140.

The control unit 140 may simulate a state of a patient's before-and-after treatment and control the display unit 130 to display it. In this case, the control unit 140 may superimpose the before-and-after treatment teeth data images (T) onto the side face image (F), respectively.

In this case, the control unit 140 may extract a feature point of the side face image (F) and then extract a reference line of the side face based on the extracted feature point. In addition, the control unit 140 may adjust the size of the teeth data image (T) according to the length of the reference line of the side face image (F). In addition, the control unit 140 may generate a superimposed image by superimposing the size-adjusted teeth data image (T) onto the side face image (F).

Hereinafter, the control unit 140 will be described in more detail with reference to FIGS. 4 to 7.

Figure 4:
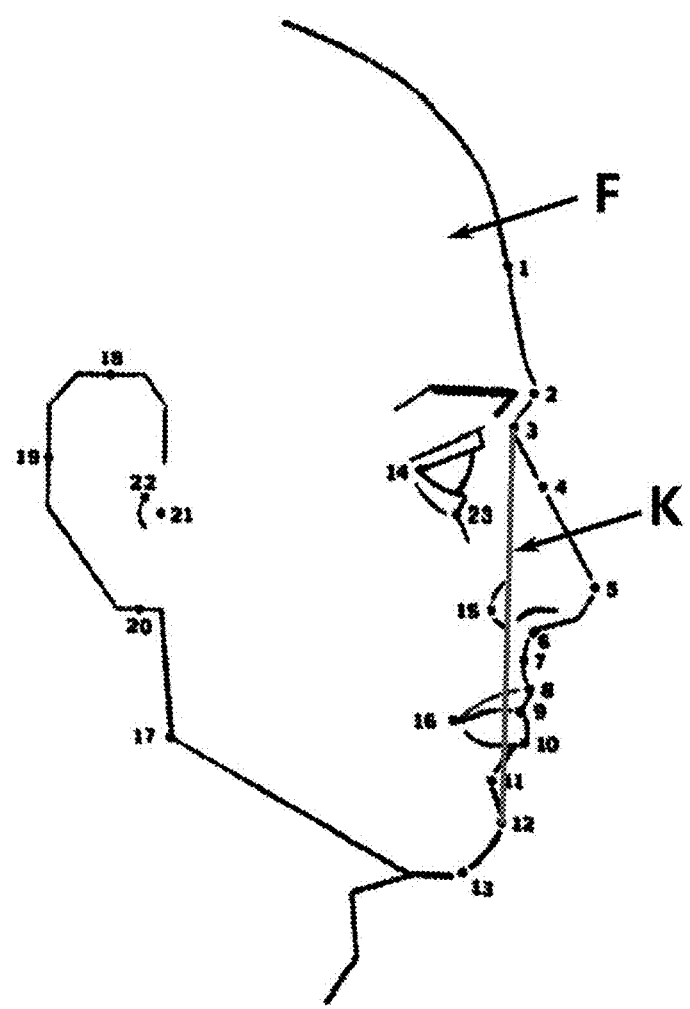
FIG. 4 is a diagram for describing extraction of a reference line of side face image in the apparatus for superimposing teeth data image onto face image according to an exemplary embodiment of the present invention.
Figure 5:
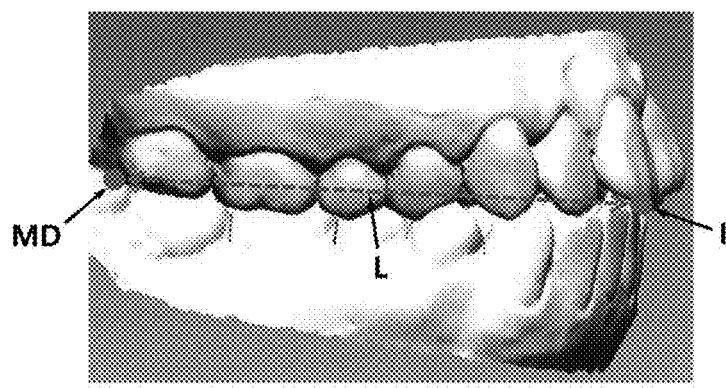
FIG. 5 is a diagram for describing adjustment of a size of a teeth data image in the apparatus for superimposing teeth data image onto face image according to an exemplary embodiment of the present invention.
Figure 6:
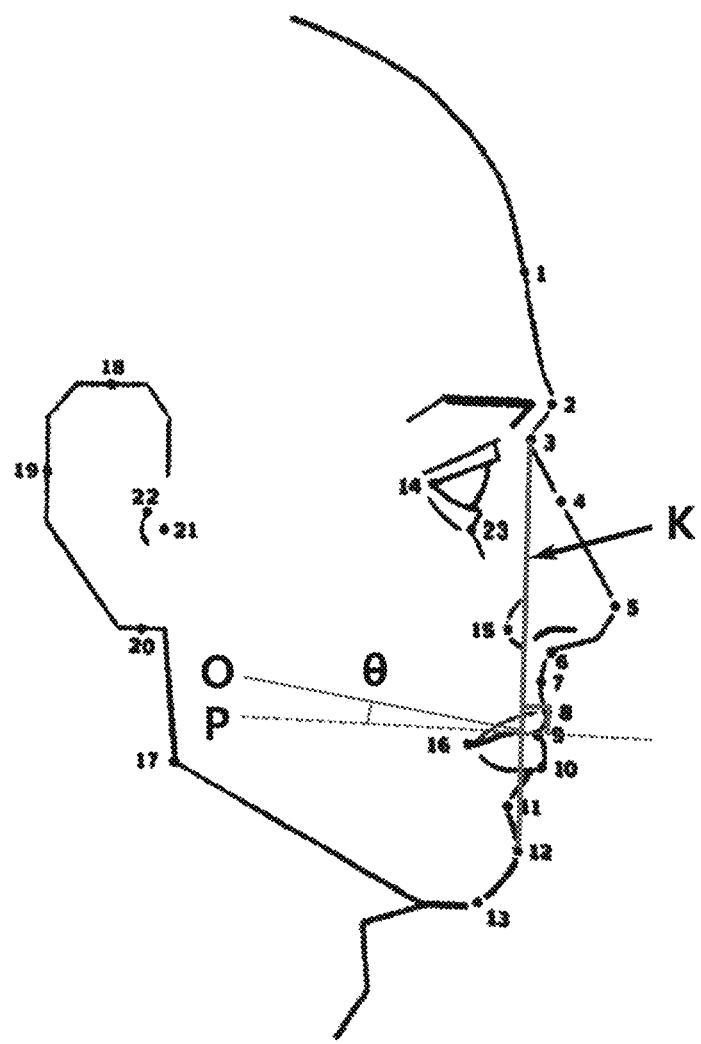
FIG. 6 is a diagram for describing superimposition of a teeth data image onto a side face image in the apparatus for superimposing teeth data image onto face image according to an exemplary embodiment of the present invention.
Figure 7:
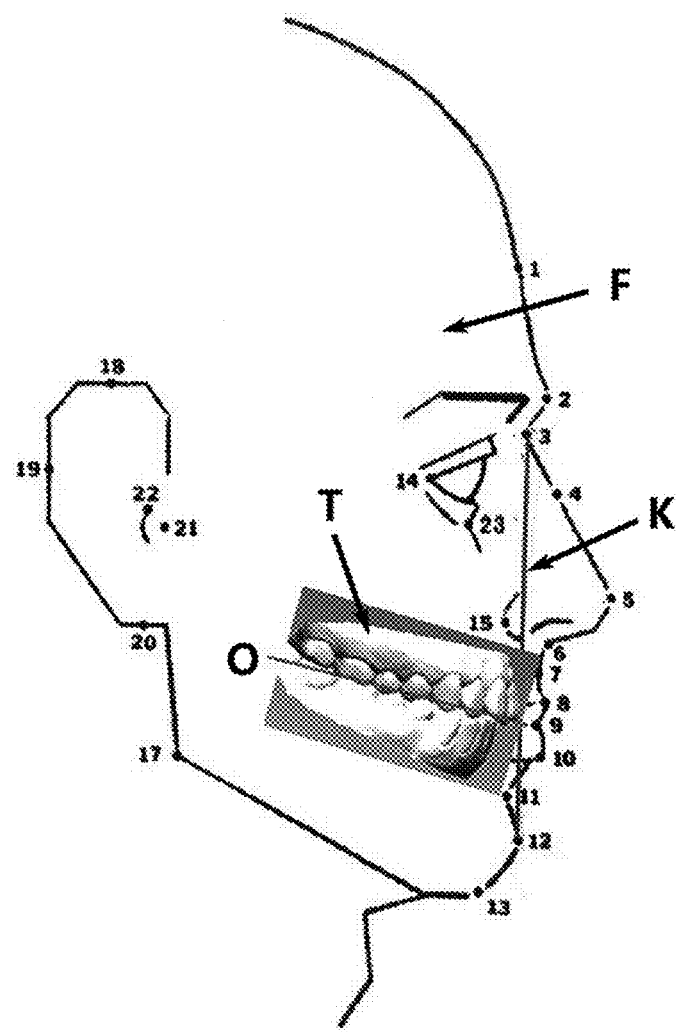
FIG. 7 is a diagram schematically showing a state of superposition of a teeth data image onto a side face image in the apparatus for superimposing teeth data image onto face image according to an exemplary embodiment of the present invention.

FIG. 4 is a diagram for describing extraction of a reference line of side face image in the apparatus for superimposing teeth data image onto face image according to an exemplary embodiment of the present invention, FIG. 5 is a diagram for describing adjustment of a size of a teeth data image in the apparatus for superimposing teeth data image onto face image according to an exemplary embodiment of the present invention, FIG. 6 is a diagram for describing superimposition of a teeth data image onto a side face image in the apparatus for superimposing teeth data image onto face image according to an exemplary embodiment of the present invention, and FIG. 7 is a diagram schematically showing a state of superposition of a teeth data image onto a side face image in the apparatus for superimposing teeth data image onto face image according to an exemplary embodiment of the present invention.

Referring to FIG. 4, the side face image (F) may include a plurality of anatomical feature points 1 to 22. Here, the control unit 140 may extract feature points from the side face image (F). In this case, the control unit 140 may extract a first feature point (Nasion) at which a nose begins and a second feature point (Pogonion), a most projecting point of a lower face.

In FIG. 4, the first feature point may be a point 3 as a portion having the lowest nasal bridge at a point between the eyes. The second feature point may be a point 12 as a tip of a chin most protruding forward from a lower jaw.

In addition, the control unit 140 may extract a reference line of the side face (K-line) connecting the first feature point 3 (Na) and the second feature point 12 (Po).

Here, the present inventor found that the reference line of the side face (K-line) is highly related to the actual size and position of the teeth. In other words, as a result of analyzing an anatomical facial statistics data, the present inventor found the fact that the size of the actual teeth converges at a constant ratio with the length of the reference line of the side face (K-line). In addition, the present inventor found that specific positions of the actual teeth converge on the reference line of the side face (K-line).

The present invention is directed to superimpose the teeth data image (T) onto the side face image (F) using the above-described characteristics. In other words, the present invention limits the size adjustment of the teeth data image (T), the rotational angle of the teeth data image (T), and the superimposing position of the teeth data image (T) according to the analysis result of the anatomical facial statistical data.

Referring to FIG. 5, the control unit 140 may calculate a shortest distance (MD-I length) between a rearmost molar distal point (MD) and a maxillary incisor point (I) from the teeth data image (T). Here, the rearmost molar distal point (MD) refers to a contact surface located at the innermost position even in the innermost tooth. In addition, the maxillary incisor point (I) refers to a contact surface of the tooth most protruding out of the upper teeth. In this case, the contact surface is a surface where a upper tooth and a lower tooth come into contact, which is the chewing surface.

Meanwhile, the teeth data image (T) is an actually measured data corresponding to the actual teeth, and the shortest distance (MD-I length) is an actual physical size. On the other hand, in the side face image (F), the size of the reference line (K-line) of the side face varies according to the photographing ratio of the camera or the size of the output image. That is, the actual length of the side face (K-line) may not be accurately known. Therefore, in order to superimpose the teeth data image (T) onto the side face image (F) the size of the teeth data image (T) should be adjusted.

To this end, the control unit 140 may adjust the size of the teeth data image (T) according to the reference line of the side face (K-line). More specifically, the control unit 140 may adjust the size of the teeth data image (T) so that the shortest distance (MD-I length) is a certain ratio to the length of the reference line of the side face (K-line).

For example, the ratio of the shortest distance (MD-I length) to the length of the reference line of the side face (K-line) may be 2.2:1 for men. In other words, for men, the shortest distance (MD-I length) may be about 46% of the length of the reference line of the side face (K-line).

In addition, the ratio of the shortest distance (MD-I length) to the length of the reference line of the side face (K-line) may be 2.1:1 for women. In other words, for women, the shortest distance (MD-I length) may be about 48% of the length of the reference line of the side face (K-line).

Accordingly, the apparatus 100 for superimposing teeth data image onto face image may superimpose by enlarging or reducing the teeth data image (T) in a ratio similar to the actual one, regardless of the size of the side face image (F).

Referring to FIG. 6, the control unit 140 may extract a third feature point (Stomion), at which upper and lower lips meet, from the side face image (F). In the FIG. 6, the third feature point may be a point 9 as a point where the upper lip and the lower lip meet when the mouth is closed.

In addition, the control unit 140 may superimpose the teeth data image (T) onto the side face image (F) so that the teeth data image (T) is rotated clockwise at a predetermined angle with respect to a perpendicular line (P) on which the reference line of the side face (K-line) and the third feature point 9 (St) are at a right angle. Here, the perpendicular line (P) refers to a line drawn vertically down from the third feature point 9 (St) to the reference line of the side face (K-line).

In this case, the teeth data image (T) may be rotated based on an occlusion line (O). Here, the occlusion line (O) refers to a line where the upper teeth and the lower teeth come into contact and occlude each other. Such occlusion line (O) may be calculated from a measured teeth data. That is, the control unit 140 may superimpose the teeth data image (T) onto the side face image (F) so that the occlusion line (O) of the teeth data image (T) is rotated at a predetermined angle with respect to the perpendicular line (P). For example, the control unit 140 may superimpose the teeth data image (T) rotated 9° clockwise with respect to the perpendicular line (P).

Referring to FIG. 7, a superimposing reference point of the teeth data image (T) with respect to the reference line of the side face (K-line) may be the maxillary incisor point (I). Accordingly, the control unit 140 may superimpose the teeth data image (T) onto the side face image (F) so that the maxillary incisor point (I) is located on the reference line of the side face (K-line).

With such a configuration, since the apparatus 100 for superimposing teeth data image onto face image may quickly superimpose images in a simple manner, it is possible to quickly check the predicted result immediately after examination and correct the treatment goal, thus improving the efficiency of transparent orthodontic treatment. In addition, the apparatus 100 for superimposing teeth data image onto face image may generate superimposed image accurately, thus improving the reliability of the predicted result for transparent orthodontic treatment.

Hereinafter, a method of for superimposing teeth data image onto face image of the present invention will be described with reference to FIG. 8.

Figure 8:
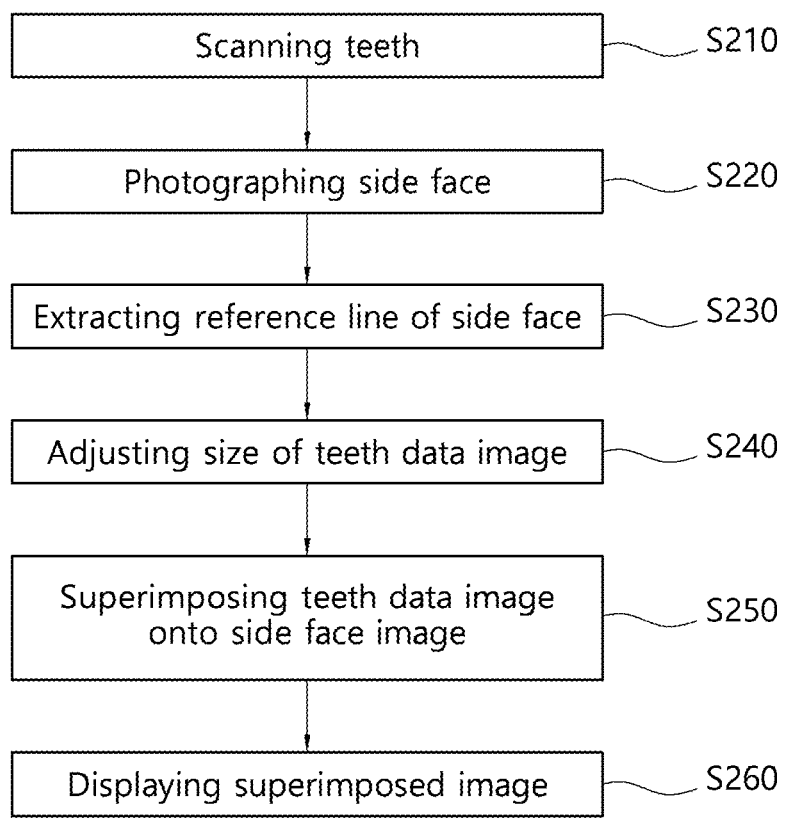
FIG. 8 is a flowchart of a method for superimposing a teeth data image onto a face image.

FIG. 8 is a flowchart of a method for superimposing a teeth data image onto a face image.

The method 200 for superimposing teeth data image onto face image includes scanning teeth (S210), photographing a side face (S220), extracting a reference line of the side face (S230), adjusting a size of a teeth data image (S240), superimposing teeth data image onto side face image (S250), and displaying superimposed image (260).

In more detail, as shown in FIG. 8, first, a patient's teeth are scanned by the scanner 110 at step S210. In this case, the scanner 110 may generate a teeth data image.

Next, the patient's side face is photographed by the camera 120 at step S220. In this case, the camera 120 may obtain a side face image.

Next, the control unit 140 extracts a reference line of the side face (K-line) at step S230. In this case, the control unit 140 may extract feature points from the side face image (F). Here, the control unit 140 may extract a first feature point 3 (Na) at which a nose begins and a second feature point 12 (Po), a most projecting point of a lower face.

In addition, the control unit 140 may extract a reference line of the side face (K-line) connecting the first feature point 3 (Na) and the second feature point 12 (Po).

Next, the control unit 140 adjusts a size of the teeth data image (T) at step S240. In this case, the control unit 140 may calculate a shortest distance (MD-I length) between a rearmost molar distal point (MD) and a maxillary incisor point (I) from the teeth data image (T).

In addition, the control unit 140 may adjust the size of the teeth data image (T) according to the reference line of the side face (K-line). More specifically, the control unit 140 may adjust the size of the teeth data image (T) so that the shortest distance (MD-I length) is a certain ratio to the length of the reference line of the side face (K-line).

For example, the ratio of the shortest distance (MD-I length) to the length of the reference line of the side face (K-line) may be 2.2:1 for men. In other words, for men, the shortest distance (MD-I length) may be about 46% of the length of the reference line of the side face (K-line).

In addition, the ratio of the shortest distance (MD-I length) to the length of the reference line of the side face (K-line) may be 2.1:1 for women. In other words, for women, the shortest distance (MD-I length) may be about 48% of the length of the reference line of the side face (K-line).

Next, the control unit 140 superimposes the size-adjusted teeth data image (T) onto the side face image (F) at step S250. In this case, the control unit 140 may extract a third feature point 9 (St), at which upper and lower lips meet, from the side face image (F).

In addition, the control unit 140 may superimpose the teeth data image (T) onto the side face image (F) so that the teeth data image (T) is rotated clockwise at a predetermined angle with respect to a perpendicular line (P) on which the reference line of the side face (K-line) and the third feature point 9 (St) are at a right angle. Here, the perpendicular line (P) refers to a line drawn vertically down from the third feature point 9 (St) to the reference line of the side face (K-line).

In this case, the teeth data image (T) may be rotated based on an occlusion line (O). Here, the occlusion line (O) may be calculated from a measured teeth data.

More specifically, the control unit 140 may superimpose the teeth data image (T) onto the side face image (F) so that the occlusion line (O) of the teeth data image (T) is rotated at a predetermined angle with respect to the perpendicular line (P). For example, the control unit 140 may superimpose the teeth data image (T) rotated 9° clockwise with respect to the perpendicular line (P).

In this case, a superimposing reference point of the teeth data image (T) with respect to the reference line of the side face (K-line) may be the maxillary incisor point (I). Accordingly, the control unit 140 may superimpose the teeth data image (T) onto the side face image (F) so that the maxillary incisor point (I) is located on the reference line of the side face (K-line).

Next, the display unit 130 displays superimposed image at step S260. That is, the display unit 130 may display an image superimposed by the control unit 140.

Accordingly, since the method 200 for superimposing teeth data image onto face image may quickly superimpose images in a simple manner, it is possible to quickly check the predicted result immediately after examination and correct the treatment goal, thus improving the efficiency of transparent orthodontic treatment. In addition, the method 200 for superimposing teeth data image onto face image may generate superimposed image accurately, thus improving the reliability of the predicted result for transparent orthodontic treatment.

Such methods may be implemented by the apparatus 100 for superimposing teeth data image onto face image as shown in FIG. 1, and in particular, may be implemented as a software program that performs such steps, wherein such program may be stored on a computer-readable recording medium or transmitted by a computer data signal combined with a carrier wave in a transmission medium or a communication network. In this case, the computer-readable recording medium may include any kind of recording device in which data readable by a computer system is stored.

Although exemplary embodiments of the present invention have been described above, the spirit of the present invention is not limited to the embodiments set forth herein. Those of ordinary skill in the art who understand the spirit of the present invention may easily propose other embodiments through supplement, change, removal, addition, etc. of elements within the same spirit, but the embodiments will be also within the scope of the present invention.

What is claimed is:

1. An apparatus for superimposing a teeth data image onto a face image, comprising: a scanner for generating the teeth data image by scanning a teeth of a patient;
   a camera for obtaining a side face image by photographing a side face of the patient; and
   a control unit for extracting a feature point of the side face image, extracting a reference line of the side face based on the feature point, adjusting a size of the teeth data image according to a length of the reference line of the side face, and superimposing the teeth data image onto the side face image.

2. The apparatus of claim 1, wherein the control unit extracts a first feature point, a second feature point, and a most projecting point of a lower face from the side face image, wherein
   the first feature point comprises a nasion, wherein a nose begins at the nasion; and the second feature point comprises a pogonion, and
   the control unit extracts the reference line of the side face connecting the first feature point and the second feature point.

3. The apparatus of claim 1, wherein the control unit calculates a shortest distance between a rearmost molar distal point and a maxillary incisor point from the teeth data image, and the control unit adjusts the size of the teeth data image, wherein the shortest distance becomes a predetermined ratio to the length of the reference line of the side face.

4. The apparatus of claim 1, wherein the control unit extracts a third feature point from the side face image, wherein the third feature point comprises a stomion, wherein an upper lip and a lower lip meet at the stomion, the control unit superimposes the teeth data image onto the side face image, wherein an occlusion line of the teeth data image is rotated clockwise at a predetermined angle with respect to a perpendicular line, wherein the reference line of the side face and the third feature point are at a right angle on the perpendicular line, and a maxillary incisor point of the teeth data image is located on the reference line of the side face.

5. The apparatus of claim 1, further comprising a display unit for displaying a superimposed image.

6. A method for superimposing a teeth data image onto a face image, comprising:

generating, by a scanner, the teeth data image by scanning a teeth of a patient;

obtaining, by a camera, a side face image by photographing a side face of the patient;

extracting, by a control unit, a feature point of the side face image and then extracting a reference line of the side face based on the feature point;

adjusting, by the control unit, a size of the teeth data image according to a length of the reference line of the side face; and superimposing, by the control unit, a size-adjusted teeth data image onto the side face image.

7. The method of claim 6, wherein the step of extracting comprises extracting a first feature point, a second feature point and a most projecting point of a lower face from the side face image, wherein the first feature point comprises a nasion, wherein a nose begins at the nasion, and the second feature point comprises a pogonion, and extracting the reference line of the side face connecting the first feature point and the second feature point.

8. The method of claim 6, wherein the adjusting comprises calculating a shortest distance between a rearmost molar distal point and a maxillary incisor point from the teeth data image, and adjusting the size of the teeth data image, wherein the shortest distance becomes a predetermined ratio to the length of the reference line of the side face.

9. The method of claim 6, the step of superimposing comprises extracting a third feature point from the side face image, wherein the third feature point comprises a stomion, an upper lip and a lower lip meet at the stomion, and superimposing the teeth data image onto the side face image, wherein an occlusion line of the teeth data image is rotated clockwise at a predetermined angle with respect to a perpendicular line, wherein the reference line of the side face and the third feature point are at a right angle on the perpendicular line and a maxillary incisor point of the teeth data image is located on the reference line of the side face.

10. The method of claim 6, further comprising: displaying a superimposed image.

* * * * *